G. BOURRELLY.
INCANDESCENT BURNER.
APPLICATION FILED JAN. 20, 1909.
1,054,333.
Patented Feb. 25, 1913.
2 SHEETS—SHEET 1.
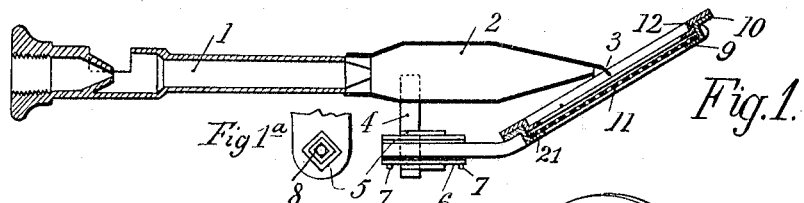
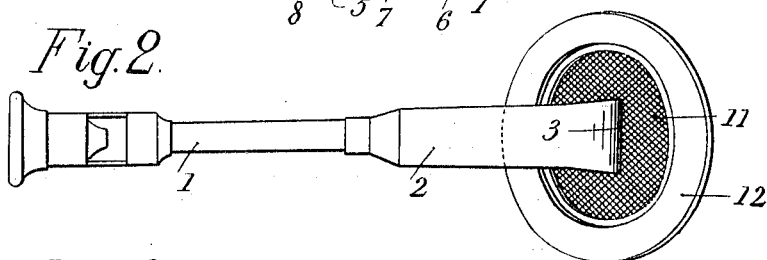
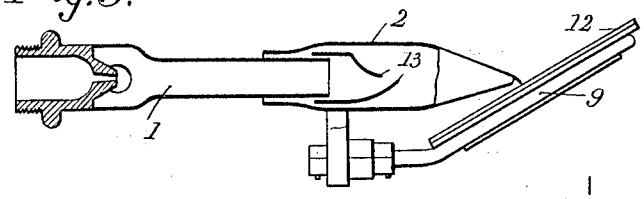
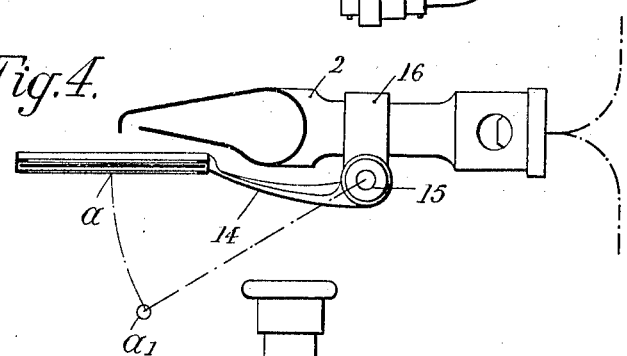
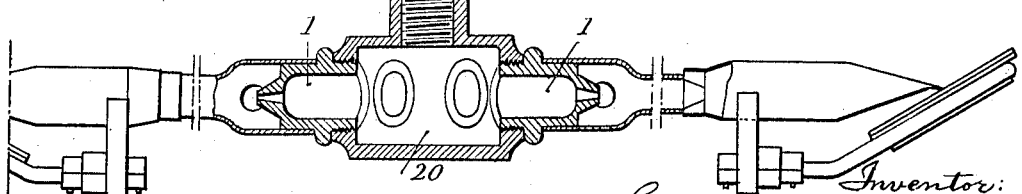

G. BOURRELLY.
INCANDESCENT BURNER.
APPLICATION FILED JAN. 20, 1909.
1,054,333.
Patented Feb. 25, 1913.
2 SHEETS—SHEET 2.
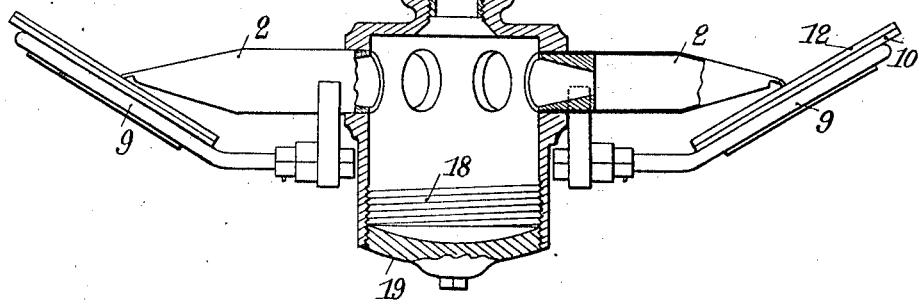
Fig. 5.
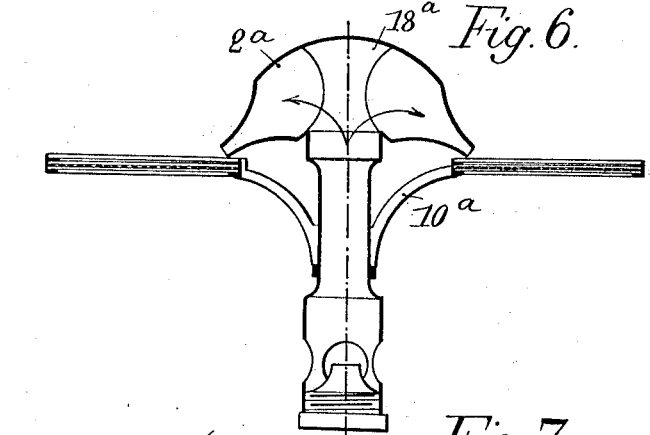
Fig. 6.
Fig. 7.
Witnesses:
E. O. Hildebrand
M. B. Taylor
Inventor
Gabriel Bourrelly
by Georgii & Massie
His Attorney

UNITED STATES PATENT OFFICE.

GABRIEL BOURRELLY, OF PARIS, FRANCE, ASSIGNOR TO RENÉ THÉTIER, OF JOINVILLE, LE MANS, FRANCE.

INCANDESCENT BURNER.

1,054,333.  Specification of Letters Patent.  Patented Feb. 25, 1913.

Application filed January 20, 1909. Serial No. 473,338.

*To all whom it may concern:*

Be it known that I, GABRIEL BOURRELLY, of 30 Rue Cardinet, Paris, France, engineer, a citizen of the Republic of France, and resident of Paris, France, have invented a new and useful Improvement in Incandescent Burners, which improvement is fully set forth in the following specification.

This invention refers to improvements in lighting by means of incandescent bodies formed of oxids of rare earths and heated by a non-lighting gas flame. These improvements consist in giving to the lighting body the shape of a substantially plane surface, supporting said surface by means of a carrier leaving quite free both faces of said surface and combining the gas burner which furnishes the non-lighting flame with the incandescent body, in such a manner that the incandescent body is concealed to the smallest possible extent by the burner and so that the former will be able to radiate the light from both faces.

The carrier consists preferably of a flat ring with the edges turned up, on which the lighting body, in the form of a disk, is fixed. The nozzle of the burner is shaped so as to deliver a broad and flat flame and is placed at such a distance from the lighting body that the flame flattens on said body and extends to the free edges of the same by virtue of capillary or adhering action in part. For this purpose the burner is provided with one or more expansion chambers in which the pressure of the mixture of air and gas delivered by the Bunsen mixing chamber is reduced. The volume of said expansion chambers may be fixed or variable. The mixture thus expanded leaves the burner through a preferably flat outlet, eventually provided with a deflector for directing the flame into contact with the incandescent disk. One Bunsen injector may be common to several burners.

In the accompanying drawing: Figure 1 is a longitudinal section of a burner, incandescent body and carrier embodying my invention; Fig. 1$^a$ a detail view in rear elevation of the carrier; Fig. 2 is a plan view of the burner, incandescent body and carrier; Fig. 3 is a partial longitudinal section of a modification; Fig. 4 is a lateral view illustrating another modification; Fig. 5 is a view partially in elevation, partially in section of another modification in the form of a multiple burner with one injector only; Fig. 6 is a longitudinal section of another modification in the form of a double burner; Fig. 7 is a plan view of the same; and Fig. 8 is a view partially in elevation, partially in section of still another modification, being a multiple burner with as many injectors as nozzles.

1 is an ordinary Bunsen burner provided with an expansion chamber 2, flattened at its outer end to form the burner nozzle and provided with a deflector 3. On the chamber 2 is fixed a bracket 4 in which is inserted a square tube 5. In said tube slides another square tube 6 provided with stops 7 and in which are fixed the two bent ends 8 of a semi-circular metal wire, which encircles a ring 9 provided with an inner flange 21 and an outer flange 10. On the inner flange rests the lighting body which is formed of a circular piece or disk 11 of fabric impregnated with oxids of rare earths, as common and well-known in Welsbach burner mantles. For example, thorium oxid may be employed. Said disk is held without pressure on the ring 9 by means of a second ring 12 held in the first through elasticity or otherwise. In Fig. 3, the mixture of air and gas penetrates into the chamber 2 through a nozzle 13 directing the jet in said chamber against the wall of the chamber so as to break the strength of the jet. In these two constructions the distance from the outlet nozzle of the burner to the disk 11 is controlled by the sliding of the tube 6 in the tube 5. In Fig. 4 this control is effected by rocking the carrier 13 around the fulcrum 15 of the arm 14 which supports the carrier. By this means the renewal of the disk is facilitated.

In Fig. 5 one injector 17 is arranged to feed several expansion chambers 2. The total volume of this expansion chamber may be varied by the following means: At the lower portion, this chamber is closed by the screw cover 19 which engages the threaded part 18 of the chamber. By turning the screw cover or plug 19 in one or the other direction, the volume of the expansion chamber is increased or diminished as will be readily understood.

In Figs. 6 and 7 the chamber 18$^a$ fed by one injector is provided with two nozzles 2$^a$ which act on two symmetrical disks carried by arms 10$^a$, capable of rotating horizontally around the stem of the burner so as to facilitate the renewal of the disks.

In Fig. 8 each burner has its own injector 1 mounted on a common gas chamber 20.

By arranging the holder for the incandescent disk in the manner illustrated, namely: by providing an outer flanged frame 9 in connection with an inner frame 12 fitting telescopically within the flanges of said outer frame disks of different thicknesses may be employed and be held perfectly tight in the holder, without play, which would result in vibrations of the incandescent disk, as is well known, and thus lead to a very unsatisfactory light. It will be noted that the expansion chamber 2 of the burner, which is in advance of the air and gas mixing chamber, is uninclosed and, hence, permits a free play of the surrounding atmosphere, thereby allowing the air and gas mixture to expand before becoming heated and obviating the danger of back pressure into the mixing tube 1.

What I claim and desire to secure by Letters-Patent is:—

1. In an incandescent lighting device, a burner comprising an air and gas mixing chamber and a flame nozzle, in combination with a carrier, a metal wire encircling said carrier, a bracket and means for adjustably securing the bent ends of said wire to the bracket to adjust the position of the frame with respect to the burner, and a flat incandescent body mounted in the carrier.

2. In an incandescent lighting device, a burner comprising an air and gas mixing chamber and a flame nozzle, in combination with a carrier consisting of a fixed flanged frame and a movable frame fitting within the flanges of the fixed frame, a metal wire encircling said carrier, a bracket and means for adjustably securing the bent ends of said wire to the bracket to adjust the position of the frame with respect to the burner, and a flat incandescent body mounted in the carrier, said lighting body being secured at its edges between the fixed and removable frame.

3. In an incandescent lighting device, a carrier and an incandescent lighting body mounted on the same, in combination with a burner comprising an air-and-gas mixing chamber, an uninclosed expansion chamber in advance of the same and in direct communication with the atmosphere at its forward portion, and a flame nozzle for directing the flame against the incandescent body.

4. In an incandescent lighting device, a carrier, and a flat incandescent lighting body mounted on the same, in combination with a burner comprising an air-and-gas mixing chamber, an uninclosed expansion chamber in advance of the same and in direct communication with the atmosphere at its forward portion, and a flattened flame nozzle for directing the flame against the incandescent body.

5. In an incandescent lighting device, an air-and-gas mixing chamber, and an uninclosed expansion chamber in advance of said mixing chamber and in direct communication with the atmosphere at its forward portion, in combination with a plurality of flame nozzles communicating with said expansion chamber, and incandescent lighting bodies arranged in advance of said nozzles.

6. In an incandescent lighting device, an air-and-gas mixing chamber, and an uninclosed expansion chamber in advance of the same and in direct communication with the atmosphere at its forward portion, in combination with a plurality of flame nozzles communicating with said expansion chamber, and incandescent lighting bodies in the path of the flame from the nozzles.

7. In an incandescent lighting device, an incandescent lighting body, in combination with a burner comprising an air-and-gas mixing chamber, an uninclosed expansion chamber in advance of the same, and in direct communication with the atmosphere, and a deflector arranged in advance of said chamber.

In testimony whereof I have signed this specification in the presence of two subscribing witnesses.

GABRIEL BOURRELLY.

Witnesses:
H. C. COXE,
F. COMBE.

Copies of this patent may be obtained for five cents each, by addressing the "Commissioner of Patents, Washington, D. C."